United States Patent

Noda et al.

[11] Patent Number: 5,641,558
[45] Date of Patent: Jun. 24, 1997

[54] WINDOW GLASS FOR AN AUTOMOBILE

[75] Inventors: Kazuyoshi Noda, Kawasaki; Tsunemitsu Koizumi, Taketoyo-machi; Kouichi Osada, Tokyo; Hisashi Nishiyama; Yasushi Takemasa, both of Kawasaki, all of Japan

[73] Assignee: Asahi Glass Company Ltd., Tokyo, Japan

[21] Appl. No.: 706,442

[22] Filed: Aug. 30, 1996

Related U.S. Application Data

[63] Continuation of Ser. No. 409,958, Mar. 23, 1995, abandoned, which is a continuation of Ser. No. 67,825, May 27, 1993, abandoned.

[30] Foreign Application Priority Data

May 27, 1992 [JP] Japan ............... 4-042219 U

[51] Int. Cl.$^6$ ............... B32B 3/00
[52] U.S. Cl. ............... 428/210; 428/195; 428/212; 428/411.1; 428/426; 428/34
[58] Field of Search ............... 428/34, 195, 210, 428/212, 411.1, 426; 296/96.19, 84.1; D12/182, 183

[56] References Cited

U.S. PATENT DOCUMENTS

| | | |
|---|---|---|
| D. 234,589 | 3/1975 | Hilsher, Jr. ............... D12/183 |
| D. 312,236 | 11/1990 | Gentei et al. ............... D12/183 |
| 3,895,859 | 7/1975 | Yoshida et al. |
| 4,138,284 | 2/1979 | Postupack ............... 156/100 |
| 4,302,263 | 11/1981 | Postupack ............... 156/100 |
| 4,488,141 | 12/1984 | Ohlenforst et al. ............... 296/84.1 |
| 4,555,434 | 11/1985 | Kunert ............... 428/194 |
| 5,234,748 | 8/1993 | Demiryont et al. ............... 428/216 |

*Primary Examiner*—Patrick Ryan
*Assistant Examiner*—Marie R. Yamnitzky
*Attorney, Agent, or Firm*—Oblon, Spivak, McClelland, Maier & Neustadt, P.C.

[57] ABSTRACT

A window glass for an automobile, wherein a surface of a single sheet of glass is provided with a dark-colored film, or wherein a window glass laminated with at least a single sheet of glass and at least a single sheet of a synthetic resin film is provided with the dark-colored film on a surface of the window glass or on an interface between the glass and the synthetic resin film characterized by that a first visible light transmittance of an emitted light transmitting portion of the window glass through which a light of an alarm lamp substantially transmits is larger than a second visible light transmittance of a dark-colored portion of the window glass formed with the dark-colored film.

15 Claims, 2 Drawing Sheets

WINDOW GLASS FOR AN AUTOMOBILE

This application is a continuation of application Ser. No. 08/409,958, filed on Mar. 23, 1995, now abandoned which is a continuation of application Ser. No. 08/067,825, filed on May 27, 1993, now abandoned.

BACKGROUND OF THE INVENTION

1. Field of the Invention

The present invention relates to a window glass having a dark-colored film for an automobile which is particularly suitable for use with a high mount stop lamp or brake lamp.

2. Discussion of Background

In recent years, glass for an automobile have been provided with various heat ray reflecting films or light ray shielding films for the purpose of providing comfort, design excellence, interior privacy at the inside of a car and the like. Above all, much of dark-colored glass of which visible light transmittance is not more than 70%, has been adopted for a rear glass, a side rear glass and the like which are disposed out of the driving visual scope. The dark-colored glass is excellent for providing comfort in a car room (or car interior), the reduction of air conditioning load, the selectability of color tone showing a luxury feeling, the excellent design, the protection of interior privacy in a car room and the like.

The main stream in the production of conventional dark-colored glass is as follows. In producing plane glass mainly by the floating method, so-called on-line dark-colored glass which is a glass made by the conventional method is provided with a dark-colored film composed of metal oxides firmly coated (by baking) on a surface on one side thereof by a spray method or the like, immediately after glass comes out of a floating furnace, with a glass temperature of 400° to 500° C. (strain point of glass). The on-line dark-colored glass is cut into a developed plane shape of a curved rear or side glass, then printed with a colored ceramic frit paste for a light shielding layer at the peripheral portion thereof and a heat wire silver paste for an electric heating defogger, and is then formed into a predetermined curved shape at an elevated temperature of 600° to 680° C. by employing a bending mold in a glass forming furnace.

Further, in recent times, providing another stop lamp (high mount stop lamp) on a rear spoiler, the top portion of a car body, a rear dash board or the ceiling in a car, other than a normal stop lamp, is extremely effective in cautioning a succeeding car, particularly when driving at night, in rain-fall, in snow-fall and in fog. A mounting ratio thereof for a new car is increasing. In the United States, the mounting thereof is already obligatory in registration.

However, when the high mount stop lamp is provided inside of a car and the dark-colored glass is employed for the rear glass, the visible light transmittance of the dark-colored glass is low, since the conventional dark-colored glass is formed with the film all over the surface of glass owing to its production method. Therefore, the light quantity transmitted from the high mount stop lamp light emitter to the outside of a car is deficient and the light emitted from the high mount stop lamp is reflected by the dark-colored film and is diverged to the inside of a car. Therefore, the high mount stop lamp installed in a car and the dark-colored glass are somewhat compatible with each other. When the dark-colored glass is adopted in the rear glass, there is a restriction in that the high mount stop lamp should be provided on the body outside of a car room or on the rear spoiler, and the like.

SUMMARY OF THE INVENTION

It is an object of the present invention to solve the above problems. According to an aspect of the present invention, there is provided a window glass for an automobile, wherein a surface of a single sheet of glass is provided with a dark-colored film, or wherein a window glass laminated with at least a single sheet of glass and at least a single sheet of a synthetic resin film is provided with the dark-colored film on a surface of the window glass or on an interface between said glass and the synthetic resin film is characterized by:

a first visible light transmittance of an emitted light transmitting portion of the window glass through which a light of an alarm lamp substantially transmits is larger than a second visible light transmittance of a dark-colored portion of the window glass formed with the dark-colored film.

DETAILED DESCRIPTION OF THE PREFERRED EMBODIMENTS

A means for generating light of an alarm lamp emitted through a window glass according to this invention, is not particularly restricted. For instance, a high mount stop lamp disposed inside of a car room proximate to a window glass may be provided which is pointed outwardly from the vehicle.

When the high mount break lamp or stop lamp disposed inside of a car room in an automobile is adopted, and a dark-colored glass is employed for a rear glass, the original function of the high mount stop lamp and the functions of the comfort inside a car room, the excellent design and the protection of interior privacy inside of a car provided by the dark-colored glass, can be compatible with each other by dispensing with the dark-colored film only at a light transmitting portion of the high mount stop lamp.

The material of the window glass of this invention is not particularly restricted so far as it has the function of a window glass for an automobile, and, therefore, organic glass made of polycarbonate or the like may be employed other than inorganic glass.

The window glass of this invention is a window glass provided with a non-opaque dark-colored film on a surface of a single sheet of glass, or a window glass laminated with at least a single sheet of glass and at least a single sheet of a synthetic resin film and provided with the dark-colored film on a surface thereof or on an interface between the glass and the synthetic resin film. For instance, a window glass can be provided in which the dark-colored film is provided on a surface of a single plate glass, a synthetic resin film or the like, or a window glass laminated and adhered with a synthetic resin film or other glass plate. For example, the window glass can be provided with the dark-colored film on a surface thereof or on an interface between the glass and the synthetic resin film, of a construction of glass/synthetic resin film, glass/synthetic resin film/glass, glass/synthetic resin film/glass/synthetic resin film, glass/synthetic resin film/ synthetic resin film or the like. When the dark-colored film is formed on a surface thereof, it is preferable to form the dark-colored film on the inside of a car to protect the film.

Figure 1:
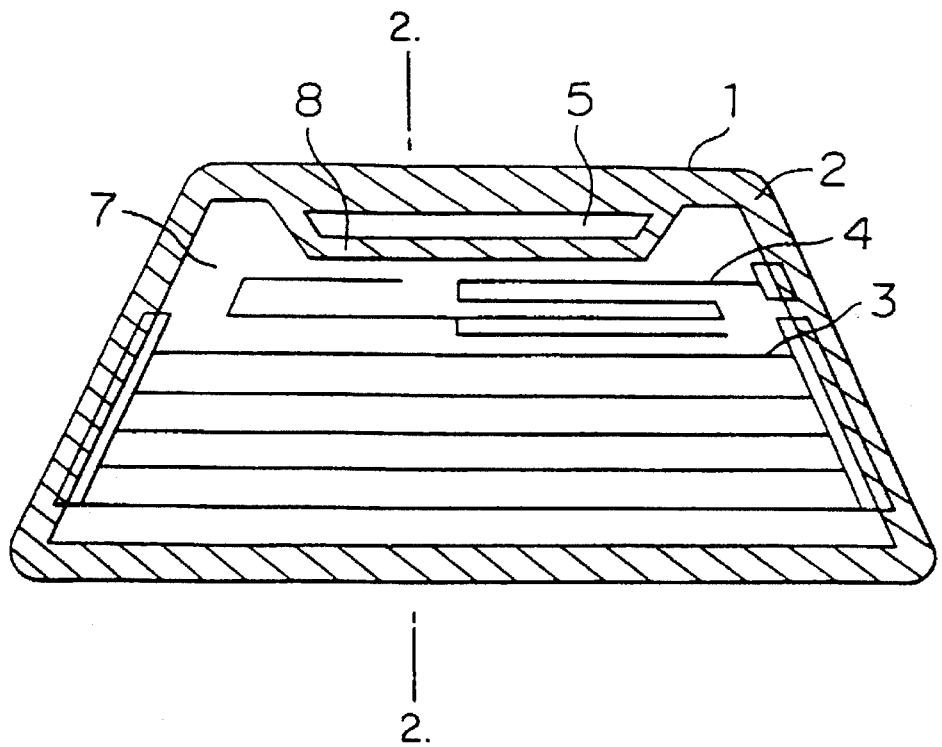
FIG. 1 is a plane view of an example of a window glass for an automobile having a high mount stop lamp of the present invention with a dark-colored film provided on a single plate glass.
Figure 2:
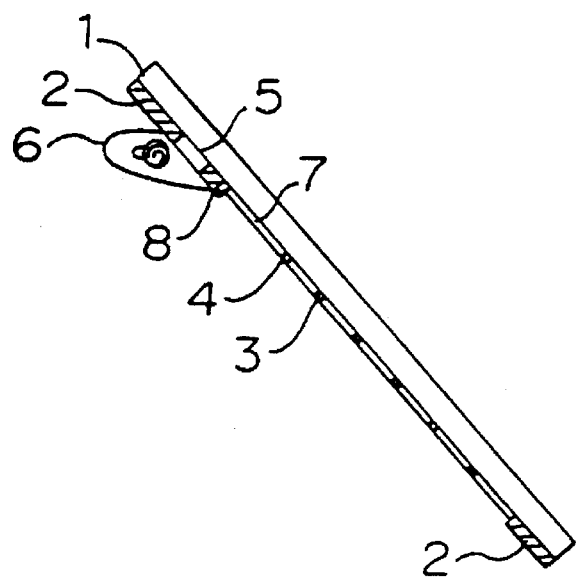
FIG. 2 is a sectional diagram taken along a line A—A of FIG. 1.

FIG. 1 is a plane view of an example of a window glass for an automobile having a high mount stop lamp with a dark-colored film provided on a single plate glass, and FIG. 2 is a sectional diagram taken along a line A—A of FIG. 1. In FIGS. 1 and 2, reference numeral 1 designates a rear glass plate, 2, a light shielding layer at the peripheral portion of the window glass, 3, a heat wire silver print providing defogging function by electric heating, 4, a rear glass antenna, 5, an emitted light transmitting portion through which light emitted from a high mount stop lamp transmits, 6, a high mount stop lamp light emitter, and 7, a dark-colored or colored film which is semitransparent or has a low transparency (i.e., non-opaque, with a positive or non-zero light transmittance as a heat ray reflecting film, a light ray shielding film and the like.

Figure 3:
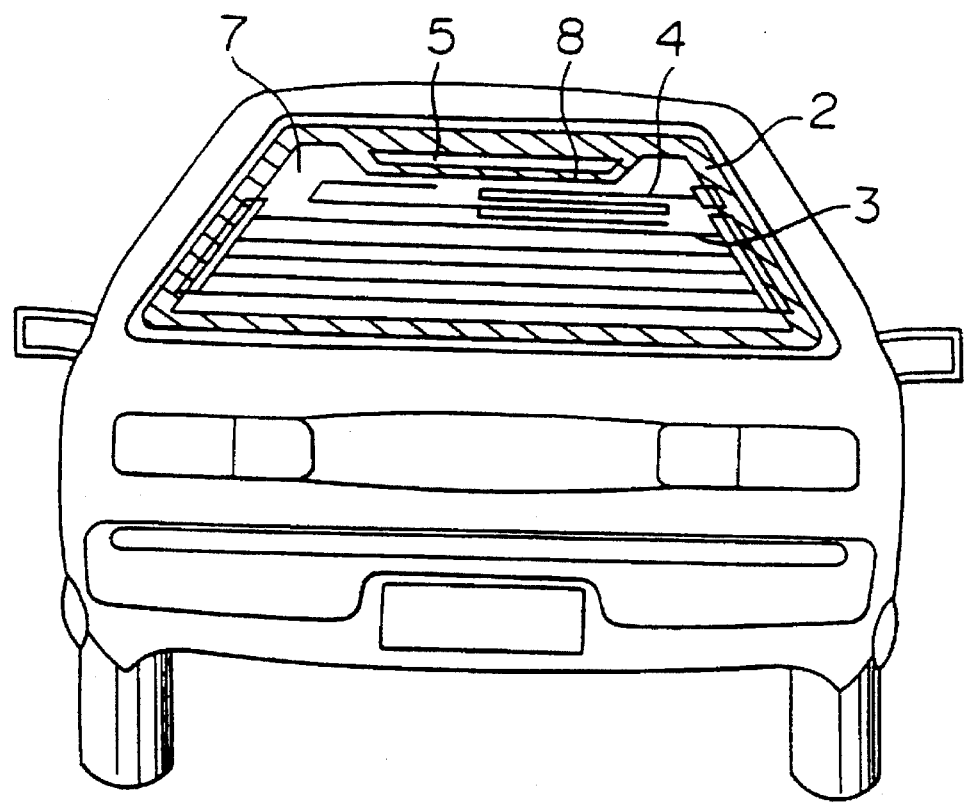
FIG. 3 is a plane diagram viewed from the rear side of an automobile with a window glass for an automobile of the present invention mounted on the automobile.

FIG. 3 is a plane diagram viewed from the rear side of an automobile when a window glass for an automobile according to this invention is mounted on the automobile.

The present invention is characterized in that the emitted light is transmitting portion 5 through which light emitted from the high mount stop lamp disposed in the vicinity of the window glass formed with the dark-colored film is rich with the visible light, compared with the dark-colored portion of this window glass formed with the dark-colored film. Specifically, the visible light transmittance of the emitted light transmitting portion 5 can be enhanced to be greater than that of the dark-colored portion, by dispensing with the dark-colored film at the emitted light transmitting portion 5, or removing the dark-colored film after the formation thereof, or forming a film having a visible light transmittance thereof which is higher than that of the dark-colored film, or the like. It is preferable that the visible light transmittance of the emitted light transmitting portion 5 is not smaller than 50% so that the high mount stop lamp sufficiently achieves its function.

It is preferable that the dark-colored film 7 is coated on the whole surface of glass excluding the emitted light transmitting portion 5 through which light emitted from the high mount stop lamp transmits, or on the whole surface of glass excluding further the peripheral portion thereof.

It is also preferable that the high mount stop lamp light emitting case is disposed in the proximity of the glass such that the light emitted by the lamp does not diverge to the inside of a car at the emitted light transmitting portion. It is particularly preferable to place the high mount stop lamp emitting case in contact with the glass.

Further, it is preferable that the portion dispensing with the dark-colored film 7 is more or less larger than the emitted light transmitting portion corresponding to the lamp. It is also preferable to print a light shielding layer 8 at the boundary between the dark-colored portion and the emitted light transmitting portion, to improve the appearance thereof and reduce divergence of the emitted light from the lamp which diverges to the inside of a car. It is preferable that the light shielding layer 8 is painted with color pigment and colored ceramic frit paste containing glass frit by printing or the like and the painted material is baked thus, particularly with a ceramic frit paste, the light shielding layer provides a substantially opaque portion in the window glass.

Although the visible light transmittance of a portion formed with the dark-colored film, of a window glass, can arbitrarily be determined, it is necessary to avoid easy peeping from the outside of a car into a car room, in the daytime, in view of the protection of the interior privacy. The heat ray shielding function (which has a tendency of increasing with a decrease in the visible light transmittance) is preferably not larger than 70%, since the higher the heat ray shielding function, the better the comfort in a car.

Further, it is preferable that the dark-colored portion is formed with a gradation portion or a shading portion wherein the visible light transmittance per unit area thereof gradually increases in a direction towards the emitted light transmitting portion, in view of the appearance and for reducing the divergence of the light emitted from the lamp which diverges to the inside of a car. It is preferable that at least a portion of the gradation portion or the shading portion overlaps on the light shielding portion which is provided at the boundary between the dark-colored portion and the emitted light transmitting portion, since the periphery of the dark-colored portion is more inconspicuous thereby.

The material for the dark-colored film is not particularly restricted. In organic materials can include a metal, a metal oxide, a metal nitride, or a metal boride is pointed out which includes at least one element selected from the group consisting of Mg, Al, Si, Ti, V, Cr, Mn, Fe, Co, Ni, Cu, Zn, Ga, Ge, As, Se, Y, Zr, Nb, Mo, Pd, Ag, In, Sn, Ba, Ta, W, Re, Pt, Au, Pb, Bi and the like. As an organic material, an organic material including the above elements can be utilized. Specifically, a metal film of Al, Ti, V, Cr, Co, Ni, Cu, Zr, Nb, Mo, Pd, Ag, Ta, W, Re, Pt, Au or the like, or a composite compound of $SiO_xN_y$, Si—C, $TiO_xN_y$, Ti—$SiO_xN_y$, Ti—$CrO_xN_y$, $TiNiO_xN_y$, $VO_xN_y$, $CrO_xN_y$, Cr—$NiO_xN_y$, $MnO_xN_y$, $FeO_xN_y$, $CoO_xN_y$, $NiO_xN_y$, $ZnO_xN_y$, Zn—$GaO_xN_y$, $SeO_xN_y$, $YO_xN_y$, $ZrO_xN_y$, Zr—$SiO_xN_y$, Zr—$BO_xN_y$, $NbO_xN_y$, $MoO_xN_y$, $InO_xN_y$, In—$SnO_xN_y$, $SnO_xN_y$, $BaO_xN_y$, $TaO_xN_y$, $WO_xN_y$, $ReO_xN_y$, $BiO_xN_y$ or the like, can be used. In most cases, these compounds are often employed in compositions which deviate from the stoichiometric ratios to provide these compounds with absorption in the visible light region, the near infrared light region and the near ultraviolet light region.

In the case of the above metal film, alloy film, inorganic film, organic film or the like, a coating of a transparent film of $SnO_2$, $INO_2$, $TiO_2$, ZnO, WO, $Al_2O_3$, $BiO_2$, $ZrO_2$, $ZrSiO_x$ or the like can be formed on the surface of the film, or a film composed of at least three layers wherein coatings of the transparent films interpose the metal film can be employed, to particularly promote durability and visible light transmittance.

The above construction of the dark-colored film is only representative. The construction of the dark-colored film may be selected from the group consisting of a further multi-layered one, a multi-layered one or a composite film, which is formed by different kinds of films, and one composed of other substances. The dark-colored film functions as the heat ray reflecting film or an ultraviolet ray shielding film depending on the film material and the construction.

The light shielding layer 2 at the peripheral portion of the window glass, the heat wire silver print 3, the rear glass antenna 4 or the like in FIG. 1 are optionally provided. The light shielding layer 2 at the peripheral portion of the window glass may be similar to the light shielding layer 8. The light shielding layer 2 and the light shielding layer 8 may be provided overlappingly and continuously at their portions as in FIG. 1, or may be provided separately.

The heat wire silver print 3 and the rear glass antenna 4 in the normal use, are made by painting a paste containing silver and glass frit by printing or the like and by baking the paste. However, this invention is not restricted to this example.

An explanation will be given of an example of a method of making a window glass for an automobile of the present invention as follows. A preparatory treatment is provided before coating the dark-colored film. First, a glass plate which is cut into a desired shape is prepared. The light shielding layer and the heat wire silver print are printed on the glass plate by the screen method or the like. A preparatory drying is performed thereon at 150° C. The glass plate is prepared in a flat plate state, or the glass plate is bent into a desired shape by the self-weight bending method, press-bending method, the roller-bending method or the air-forming method. Further, the glass plate is tempered, if necessary. When a laminated glass is employed, two sheets of glass are prepared as material for the laminated glass and the same preparatory treatment is performed.

A surface of the glass plate on which the dark-colored film is to be coated, is cleaned by employing a sufficient amount of powders of cerium oxide as an abrasive material, dried, and dust is removed. Next, a portion corresponding to the high mount stop lamp and the peripheral portion of the surface of the glass, if necessary, of the surface of the glass plate are masked. Thereafter, a desired dark-colored film and the like are formed by pertinent film forming methods of various vacuum film forming methods such as the sputtering method, the vacuum deposition method, the plasma deposition method and the like; the spray method, the CVD method, the CLD method, the plating method, the dipping method, and printing methods such as the screen printing method and the flexographic printing method.

Various kinds of tapes, various kinds of photoresists and the like can be employed as the material for masking. Further, when the dark-colored film is formed by covering the masking material by a cover having a rigidity to some degree such as a glass plate and having a size a little larger than that of the masking area, the material for the dark-colored film may diffuse to beneath the cover to some degree, which may be preferable in view of the appearance, since the boundary of the dark-colored film can be shaded.

Further, it is possible to produce the window glass for an automobile by stripping off a predetermined portion of the coated film by etching or the like, after the dark-colored film is formed on the whole surface of the window glass.

In case of a laminated glass which is formed with the film on the inner side of glass so that the film contacts an intermediate film, the laminating of glass is performed after the film is formed. In the case of making a laminated glass formed with the film on the outer side of glass, the orders of the film forming step and the laminating step are pertinently determined in consideration of the layout of the steps, the product yield, the quality and the like.

The gist of this invention is to provide a portion dispensing with the dark-colored film on a certain area of the dark-colored glass. Therefore, other materials having the same function as in glass can be employed, and the production method such as the glass forming method, the film forming method, the masking method, the laminating method or the like, is not restricted, so far as the gist is satisfied.

EXAMPLE 1

Bronze glass having a plate thickness of 3.5 mm is cut into a predetermined shape. A light shielding layer and a heat wire silver print are provided thereon. A masking plate is fixed on a rear glass of an automobile performed with bending and tempering, at a portion of the rear glass corresponding to a high mount stop lamp and the peripheral portion of glass, after cleaning. The assembly is carried into a vacuum sputtering film forming device. A chromium nitride film of $CrN_x$ is formed of a thickness of about 400 Å by a reactive sputtering employing a Cr metal as a sputtering source and introducing a mixture gas of Ar and $N_2$, on which a composite oxide film whose major component is $ZrO_2$, is formed as an overcoating film of a thickness of about 100 Å.

The portion formed with a dark-colored film of the window glass having the dark-colored film for the use of the high mount stop lamp, obtained as above, looks similar to a window glass having a heat ray reflecting film employed in a side rear glass of the same make of car, with respect to the color tone. The visible light transmittance of the dark-colored film portion of the window glass is about 30%. The glass is provided with the function of the dark-colored glass. The visible light transmittance of a portion of the window glass having no dark-colored film for the use of the high mount stop lamp, is about 80%. Accordingly, the high mount stop lamp installed inside of a car, can sufficiently achieve its function.

EXAMPLE 2

Clear glass having the plate thickness of 3.5 mm is cut into a predetermined shape. A light shielding layer and a heat wire silver print are provided thereon. A masking plate is fixed on a rear glass of an automobile performed with bending and tempering, at a portion corresponding to a high mount stop lamp and the peripheral portion of glass, after cleaning. A cover having the size larger than that of a hollow portion of the dark-colored film for the use of the high mount stop lamp, by 1 cm with respect to its orthogonal direction, is arranged on the window glass at a hollow portion of the dark-colored film for the use of the high mount stop lamp, at the height of 2 cm. The assembly is carried into a vacuum sputtering film forming device. A chromium nitroxide film of $CrN_xO_y$ is formed of a thickness of about 600 Å by a reactive sputtering employing a Cr metal as a sputtering source and introducing a mixture gas of Ar, $N_2$ and $O_2$, on which a composite oxide film whose major component is $ZrO_2$ is formed as an overcoating film of a thickness of about 100 Å.

The portion formed with a dark-colored film of the window glass having the dark-colored film for the high mount stop lamp, provided as above, looks similar to a window glass having a heat ray reflecting film employed in a side rear glass of the same make of car, with respect to the color tone. The visible light transmittance of the dark-colored film portion of the window glass is about 40%. The glass is provided with the function of the dark-colored glass. The visible light transmittance of a portion of the window glass having no dark-colored film for the use of the high mount stop lamp, is about 87%. Accordingly, the high mount stop lamp installed inside of a car can sufficiently achieve its function. The boundary between the dark-colored film and the emitted light transmitting portion of the high mount stop lamp shaded, which provides an excellent appearance.

EXAMPLE 3

Dark-colored heat ray reflecting glass having a titanium oxide film with the plate thickness of 3.5 mm is cut into a predetermined shape. A masking plate is press-fit to surround a hollow portion of a dark-colored film for the use of the high mount stop lamp and the peripheral portion of glass such that an etching solution does not contact the other portion. The hollow portion of the dark-colored film for the use of the high mount stop lamp and the peripheral portion of glass of the heat ray reflecting film (titanium oxide film) are stripped off by employing a 0.5 normal aqueous solution of sulfuric acid. The glass is provided with a light shielding layer and a heat wire silver print after cleaning and performed with bending and tempering thereby producing a rear glass for an automobile. The portion formed with a dark-colored film of the glass window having the dark-colored film for the use of the high mount stop lamp looks similar to a window having a heat ray reflecting film employed in a side rear glass of the same make of car, with respect to the color tone. The visible light transmittance of the dark-colored film portion of the window glass is about 27%. The glass is provided with the function of the dark-colored glass. The visible light transmittance at a portion of the window glass having no dark-colored film for the use of the high mount stop lamp, is about 76%. The high mount stop lamp installed inside of a car can sufficiently achieve its function.

According to the present invention, a window glass for an automobile can be provided which is particularly excellent in design, and which is provided with functions of high heat ray reflecting and the like, and wherein a high mount stop lamp installed inside of a car can achieve its original function.

What is claimed is:

1. A rear window glass for an automobile comprising:
   a first portion having a positive first visible light transmittance;
   a second portion having a second visible light transmittance, wherein said second visible light transmittance is not smaller than 50%;
   wherein said first portion includes a non-opaque coating of a dark colored film such that said first portion is darkened relative to said second portion and said second visible light transmittance is greater than said first visible light transmittance;
   wherein said first portion extends about peripheral portions of said second portion, and wherein said first portion constitutes a majority of said window glass;
   wherein a gradation portion or shading portion is disposed between said first portion and said second portion, and a visible light transmittance of said gradation portion or shading portion increases in a direction from said first portion to said second portion such that parts of said gradation portion or shading portion which are closer to said first portion have a lower visible light transmittance than parts of said gradation portion which are closer to said second portion; and
   a brake lamp disposed adjacent to an interior side of said window glass and proximate to said second portion such that light from said brake lamp passes through said second portion.

2. The window glass of claim 1, further including a light shielding layer extending along a periphery of said window glass such that said light shielding layer is between said second portion and a peripheral edge of said window glass on one edge of said window glass, and said light shielding layer is disposed between a peripheral edge of said window glass and said first portion on another edge of said window glass.

3. The window glass of claim 1, wherein said first visible light transmittance is not larger than 70%.

4. The window glass of claim 1, further including a light shielding layer disposed between said first portion and said second portion, and wherein said light shielding layer has a third visible light transmittance which is different than each of said first and second light transmittances.

5. The window glass of claim 4, wherein said light shielding portion is opaque.

6. The window glass of claim 4, wherein said gradation portion or shading portion is disposed at a boundary of said first portion such that said gradation portion or shading portion is at least partially disposed between said light shielding portion and said first portion, and said light shielding portion is at least partially disposed between said gradation portion or shading portion and said second portion.

7. The window glass of claim 1, further including a light shielding portion extending about a periphery of said window glass and between said first and second portions, said light shielding portion having a visible light transmittance different from each of said first and second visible light transmittances.

8. The window glass of claim 1, wherein said second portion of said window glass is disposed adjacent to a periphery of said window glass and wherein said second portion extends in a direction away from said periphery of said window glass and in a direction toward a center of said window glass.

9. A rear window glass for an automobile comprising:
   a first portion having a positive first visible light transmittance;
   a second portion having a second visible light transmittance, wherein said second visible light transmittance is not smaller than 50%;
   wherein said first portion includes a non-opaque coating of a dark colored film such that said first portion is darkened relative to said second portion and said second visible light transmittance is greater than said first visible light transmittance;
   wherein said first portion extends about peripheral portions of said second portion, and wherein said first portion constitutes a majority of said window glass; and
   wherein a light shielding portion is disposed between said first portion and said second portion, said light shielding portion having a third visible light transmittance which is different from each of said first and second visible light transmittances; and
   a brake lamp disposed adjacent to an interior side of said window glass and proximate to said second portion such that light from said brake lamp passes through said second portion.

10. The window glass of claim 9, further including a second light shielding portion extending along a periphery of said window glass such that said second light shielding portion is disposed between said second portion and a peripheral edge of said window glass on one edge of said window glass, and said second light shielding portion is disposed between a peripheral edge of said window glass and said first portion on another edge of said window glass.

11. The window glass of claim 9, wherein said first visible light transmittance is not larger than 70%.

12. The window glass of claim 9, wherein said second portion of said window glass is disposed adjacent to a periphery of said window glass and wherein said second portion extends in a direction away from said periphery of said window glass and toward a center of said window glass.

13. A rear window glass for an automobile comprising:
   a non-opaque first portion having a positive first visible light transmittance;
   a second portion having a second visible light transmittance, wherein said second visible light transmittance is not smaller than 50%;
   a third portion extending about a periphery of said window glass such that said first portion and said second portion are disposed within said third portion, said third portion including a first light shielding layer, said first light shielding layer having a third visible light transmittance which is different from each of said first and second visible light transmittances, and wherein said first portion includes a coating of a dark colored film such that said first visible light transmittance is less than said second visible light transmittance;

said second portion located adjacent to part of said third portion, and further wherein said second portion includes peripheral portions which are not adjacent to said third portion and wherein said first portion extends about said peripheral portions of said second portion which are not adjacent to said third portion such that said peripheral portions of said second portion which are not adjacent to said third portion are surrounded by said first portion;

said window glass further including a boundary between said first portion and said second portion, and wherein said boundary includes at least one of (1) and (2) below as follows:

(1) a gretion portion or shading portion having a visible light transmittance which varies in a direction from said first portion to said second portion; and (2) a second light shielding layer having a visible light transmittance which is substantially equal to said third visible transmittance of said first light shielding layer; and a brake lamp disposed adjacent to an interior side of said window glass and proximate to said second portion such that light from said brake lamp passes through said second portion.

14. The window glass of claim 13, wherein said boundary includes said second light shielding layer.

15. The window glass of claim 13, wherein said boundary includes both said gradation portion or shading portion and said second light shielding layer.

* * * * *